T. W. MILLER.
PROCESS OF MAKING SPONGE RUBBER BALLS.
APPLICATION FILED NOV. 5, 1921.
1,409,059.
Patented Mar. 7, 1922.
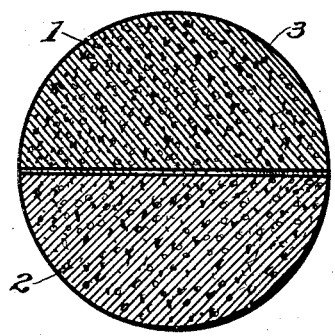
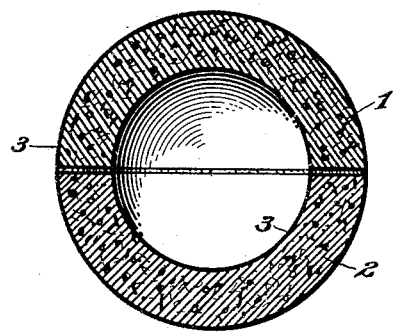
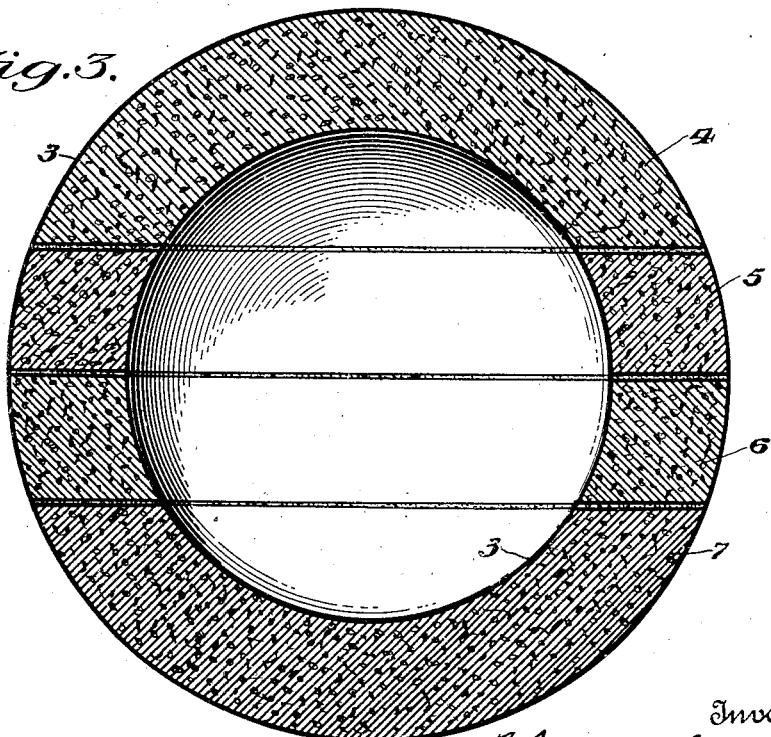
Inventor
Thomas W. Miller
By Percy B. Hills
Attorney

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

PROCESS OF MAKING SPONGE-RUBBER BALLS.

1,409,059.  Specification of Letters Patent.  Patented Mar. 7, 1922.

Application filed November 5, 1921. Serial No. 513,043.

*To all whom it may concern:*

Be it known that I, THOMAS W. MILLER, a citizen of the United States, residing at Ashland, county of Ashland, State of Ohio, have invented certain new and useful Improvements in Processes of Making Sponge-Rubber Balls, of which the following is a specification.

My invention relates to the manufacture of balls composed of sponge-rubber, and has for its object to provide an improved process of making the same, whereby there will be practically no limit to the size of the balls made.

In the manufacture of sponge-rubber, it has been found in practice that the unvulcanized rubber gum mixed with a suitable chemical, which, under the vulcanizing heat, will generate the gas necessary to expand the rubber into a spongy structure, cannot be lifted more than 2½ to 4 inches at the outside, and, furthermore, under the extreme limit of expansion is liable to overcure at the base. This has prevented the manufacture of rubber balls of a diameter greater than approximately 3 inches, and it is the object of my present invention to overcome this difficulty so that sponge-rubber balls of practically any size can be made.

This object, I accomplish by forming the balls in a plurality of sections of sponge-rubber, which, when assembled, will constitute a sphere or ball, and then uniting the same. In this way I can form these sections each a thickness of, say, from 2 to 3 inches, and by increasing the number of sections can form a complete ball of sponge-rubber of practically any desired size.

In the accompanying drawing:—

Figure 1 is a sectional view of a solid sponge-rubber ball formed in two sections and united.

Figure 2 is a similar view of a sponge-rubber ball formed in two sections and united, the same being shown hollow at its center.

Figure 3 is a similar view of a hollow sponge-rubber ball formed in four sections.

Similar numerals of reference denote corresponding parts in the several views.

In the said drawing, referring more particularly to Figure 1, the two sections 1 and 2 are formed in molds in the usual manner, that is to say, by placing therein a mixture of rubber stock capable of vulcanization and a chemical capable of being decomposed and thus forming a gas upon the application thereto of the same degree of heat required for vulcanizing the rubber. Thus, there will be produced two hemispheres of sponge-rubber, each covered with a skin or rind 3 substantially impervious to the air, as is well known in the manufacture of these goods. Two of these sections then may be united in any suitable manner, such as by cementing, cold curing or hot curing, and will constitute a complete rubber ball, each of said sections being from 2 to 3 inches in thickness, thereby forming a ball from four to six inches in diameter.

In Figure 2, I have shown a similar ball, but formed hollow in its center, it being understood that the skin or rind upon the sections completely encloses each of said sections.

In Figure 3, I have shown a ball composed of four sections 4, 5, 6 and 7, and while the same is shown hollow in its center, it will be understood that these sections may be made solid, as shown in Figure 1, if desired. By so forming these sections that when a group of them are assembled they will form a sphere, it will be understood that when permanently connected, in the manner hereinbefore described, a sponge-rubber ball of practically any dimension may be formed, none of the sections exceeding 3 inches in thickness.

The product is claimed in copending application 513,044 of even date.

Having thus fully described my invention, what I claim as new and desire to secure by Letters Patent, is:—

1. The process of making sponge-rubber balls, which consists in first forming a plurality of sections of sponge rubber which when assembled will form a ball, and then permanently uniting said sections.

2. The process of making sponge-rubber balls, which consists in first forming a plurality of sections of sponge rubber which when assembled will form a ball, said sections each being formed by expanding under a vulcanizing heat rubber stock charged with a chemical which decomposes under said heat to form a gas, and then permanently uniting said sections.

3. The process of making sponge-rubber balls, which consists in first forming a plurality of sections of sponge rubber which when assembled will form a ball, said sections each being formed by expanding under a vulcanizing heat rubber stock charged with a chemical which decomposes under said heat to form a gas, said sections when formed embodying an enveloping skin or rind over their entire areas, and then permanently uniting said sections.

In testimony whereof I hereunto affix my signature.

THOMAS W. MILLER.